United States Patent Office 3,511,600
Patented May 12, 1970

3,511,600
PREPARATION OF AQUEOUS SLAKED LIME
SLURRY AND DICALCIUM ORTHOPHOSPHATE
Keun Y. Kim, St. Louis, Mo., assignor to Monsanto Company, St. Louis, Mo., a corporation of Delaware
No Drawing. Continuation-in-part of application Ser. No. 659,874, Aug. 11, 1967. This application May 8, 1968, Ser. No. 727,673
Int. Cl. C01b 25/32; C01f 11/02
U.S. Cl. 23—109                                    12 Claims

ABSTRACT OF THE DISCLOSURE

The present invention relates to a process for the preparation of slaked lime which has a solids concentration of 10% to 44% by weight and has a predetermined and controlled viscosity level. The process generally comprises the vapor phase hydration (also known as dry hydration) of said lime followed by the liquid phase hydration (also known as wet slaking) thereof. During the vapor phase hydration, a sufficient amount of water to supply 5% to 90%, depending upon the water reactivity (hereinafter defined) of such lime and the end desired viscosity level, by weight of that water required to theoretically completely hydrate said lime is contacted therewith. After aging the resultant free-flowing partially hydrated lime particles, the liquid phase hydration takes place wherein said particles are contacted with additional amounts of water, which is at a temperature of 50° C. to 100° C., to complete the hydration thereof and produce an aqueous slurry having the aforesaid solids concentration. In practicing the above process, the slaked lime so produced has a certain viscosity level, i.e. less than 2500 centipoises at 25° C. and based upon a 17% by weight, CaO concentration (as measured by the test hereinafter set forth), such level having been predetermined and controlled predicated upon the water reactivity of the lime and the amount of water utilized in the prehydration step, i.e. the vapor phase hydration step. The slaked lime slurry is reacted with phosphoric acid to form dicalcium orthophosphate.

---

This application is a continuation-in-part of my co-pending application for Letters Patent, Ser. No. 659,874 filed Aug. 11, 1967 now abandoned.

The present invention generally relates to novel processes for preparing (wet-) slaked lime from "highly reactive lime," hereinafter defined. Such wet slaked lime is used herein to mean an aqueous slurry containing hydrates of calcium oxides, for example, calcium hydroxide. More particularly, this invention relates to an improved process for preparing slaked lime which is characterized by having a substantially low (but predetermined and controlled) viscosity, as hereinafter set forth. Slaked or hydrated lime either produced in a continuous or batchwise process from commercial lime and/or a calcium oxide-containing material, and obtained in the form of an aqueous slurry, has a variety of uses, especially in technical or industrial processes. For example, in the treatment of water, slaked lime is used for correcting the pH or acidity of water, as an aid in coagulating suspended matter in the water or other aqueous liquids, and as one of the treating agents in the so-called lime-soda process for softening water. In addition, slaked lime may be reacted with phosphoric acid to produce a variety of calcium phosphates or may be reacted with other acids to form other calcium salt derivatives.

In general, the prior art suggests several ways of hydrating lime (1) to form a dry-hydrated material or paste or (2) to form wet-slaked lime by directly reacting lime with an excess of water. In this latter method, the slaked lime is produced by contacting lime, i.e., calcium oxide or a calcium oxide-containing material, with an excess of water (to form an aqueous slurry or paste) so that the calcium oxide is converted to calcium hydroxide due to the hydration of said lime. Such processes and minor variations thereof (which include apparatuses for carrying out said operations) are exemplified in U.S. Pats. 1,871,530; 2,560,016; 2,611,683; 2,833,626; 2,904,401; 3,044,857; 3,106,453; 3,120,444; 3,165,380; 3,305,311 and 3,366,450, all of which patents are incorporated herein by reference.

In the production of slaked lime, one of the problems encountered is the handling of an aqueous calcium hydroxide-containing slurry which is not used immediately after preparation and/or which must be transferred or conveyed to a point which is somewhat distant from the point at which it was prepared. If the viscosity of such calcium hydroxide-containing slurry, hereinafter referred to as "slurry" (for convenience), is too high (for example, 2500 centipoises at 25° C. and based upon a 17%, by weight, CaO concentration), difficult handling and/or pumping problems are encountered.

In conjunction with the viscosity term "2500 centipoises at 25° C." used herein, it is to be understood that this is predicated upon the measurement of about a 17%, by weight, CaO concentration in the "slaked lime" or "slurry." In other words all the viscosity values referred to herein are obtained from a "slurry" containing approximately 17%, by weight, calcium oxide, CaO. As illustrative of this facet, it should be understood that when reference is made to a "slurry" or "slaked lime" having a 44% CaO concentration and a viscosity below "2500 centipoises at 25° C.," the viscosity value is obtained by first diluting with water a sample of the slurry to yield a 17%, by weight, CaO concentration and then measuring this diluted sample. By the same token, it is to be understood that when reference is made, for example, to a "slurry" or "slaked lime" having a 10% CaO concentration and a viscosity below "2500 centipoises at 25° C.," the viscosity value is obtained by adding additional amounts of partially prehydrated lime to a sample of the "slurry" to yield a 17%, by weight, CaO concentration and then measuring this 17% CaO sample.

The aforementioned viscosity problem has recently come about due to the way in which lime is prepared from a limestone or calcium carbonate material. More specifically, in the past, lime has generally been produced in a vertical (stationary) kiln wherein limestone-containing material is merely dumped into the top portion of a vertically extending vessel and is heated with hot gases which are injected into the bottom portion thereof in order to convert the calcium carbonate to calcium oxide by driving off carbon dioxide. In order to provide a continuous process for preparing large volumes of calcium oxide or lime and a more economical process, the so-called "rotary kiln process" was devised wherein the calcium carbonate was fed into one end of said kiln and discharged from the other end of said kiln as calcium oxide, the conversion being accomplished by the heat supplied from the counter-current flow of hot gases through said kiln.

In conjunction with the utilization of a stationary vertical reaction kiln the end product can be either a "soft burned lime" or a "hard burned line," which terms are hereinafter defined. The "hard burned lime" is characterized, after being slaked to produce an aqueous slurry thereof, by having a substantially low viscosity, that is, a viscosity below 2500 centipoises at 25° C. as measured by the test hereinafter defined. The "soft burned line" is characterized by having a viscosity greater than 2500 centipoises.

The slaked lime viscosity heretofore mentioned was found to be directly related to the "water reactivity" value of the resulting lime, i.e. "soft or hard burned," produced from the heating of the limestone in the stationary vertical reaction vessel. This water reactivity value of a lime is the measurement of the maximum temperature rise of a 20% aqueous slurry, that is, 80% water and 20% lime. This temperature rise is the result of admixing the lime with water, which is initially at 24° C., contained in a temperature sensing device such as a colorimeter. This water reactivity characteristic is believed to measure and be directly related to the rate of hydration of the lime, and is also believed to be indirectly related to the porosity and the surface area of said lime. Such characteristics are believed to directly affect the quality of the resultant slaked lime as will be shown hereinafter in the specification examples. It is to be understood, however, that the ideas and beliefs set forth herein are not to be considered as limitations of the novel processes of the present invention.

In the technological shift from the production of lime utilizing the aforementioned stationary vertical reaction vessel to the utilization of the aforementioned rotary kiln, it was found that as a practical matter only the soft burned lime could be produced mainly due to the low operating temperature of the rotary kiln. For example, in the production of lime utilizing the aforesaid stationary vertical reaction vessel, the operating temperatures are about 900° C. to 1300° C. whereas the temperatures utilizd in the rotary kiln are about 590° C. to 900° C. The higher temperatures utilized in the vertical kiln were found to be unsuitable in the rotary kiln for various reasons, such as for example, at times a "lime ring" would be built up on the interior peripheral surface of the rotary kiln due to the initial contact of the hot gases (which are generally injected into said kiln at a flow pattern countercurrent to the limestone flow pattern) with the lime being discharged. Such build-up promotes inefficiency and also ultimately results in the necessity of stopping said kiln and cleaning it. Consequently, it was necessary to reduce the overall hot gaseous temperature. This reduction in temperature and the operation of the rotary kiln at the above-described (low) temperatures resulted then in the production of only the "soft burned lime" which has a water reactivity, hereinbefore defined, above 30° C. and generally in the range of from about 30° C. to about 44° C. While the resultant lime which was produced by the utilization of the aforesaid (stationary) vertical kiln generally yielded a "hard burned lime" which had a water reactivity of less than 30° C. and generally in the range of from 15° C. to about 30° C., the resultant slaked lime slurries therefrom generally had a viscosity of less than 2500 centipoises at 25° C. However, the resultant slaked lime produced by the utilization of lime (i.e., soft burned lime) prepared from the rotary kiln process resulted in a substantial increase in viscosity of the slaked lime aqueous slurry as contrasted to those slurries produced by using the "hard burned lime" from the vertical kiln. Thus, it can readily be seen that in order to overcome this viscosity problem there was a definite need in the art to provide a wet-slaked lime (which uses a soft burned lime, i.e. a high water reactivitiy, as a starting material), that is, an aqueous slurry containing particles of completely hydrated lime, which would be characterized by having a viscosity below 2500 centipoises at 25° C. The present invention, then, overcomes the aforementioned high viscosity problem and provides novel processes as hereinafter described for the production of slaked lime having a substantially low viscosity, that is, a viscosity which is less than 2500 centipoises at 25° C., and which is thus capable of being easily transferred or conveyed without any problems which are inherent in the use of a high viscosity slaked lime.

Accordingly, it is one object of the present invenion to provide an improved process for preparing wet-slaked lime.

It is another object of the present invention to provide, from a soft burned lime, a slaked lime which is characterized by having a low viscosity which does not substantially change over a period of time.

It is a further object of the present invention to provide a process for the preparation of slaked lime having a predetermined and controlled viscosity.

It is a still further object of the present invention to provide a process for preparing a high quality slaked lime which may subsequently be reacted with other materials, for example, phosphoric acid to form various derivatives of said lime, such as calcium phosphates, which are of high quality and which have not been adversely affected by the use of said lime. A further object of the present invention is to provide a process for the production of slaked lime which contains a minimum of grit, as hereinafter defined, or other impurities.

Still further objects and advantages of the present invention will become apparent from the subsequent description and appended claims.

It has unexpectedly been discovered that the aforementioned high viscosity problem resulting from the slaking of the "soft burned lime" can be overcome by partially prehydrating said lime (prior to slaking) to form a free-flowing product which is dry to the touch. After aging the partially prehydrated lime, said product is wet-slaked. The end result of this wet-slaked lime is an aqueous slurry which comprises water having suspended therein hydrated lime particles. The overall viscosity of the slurry is substantially lower, particularly after aging for at least one hour, than that slaked lime which does not undergo a partial prehydration step. It was further discovered that the viscosity of the slaked lime can be predetermined and controlled by the extent of the prehydration of the "soft burned lime" taking into consideration the water reactivity of said soft burned lime.

More specifically, the present invention provides a process for the preparation of slaked lime which has a low, predetermined, and controlled viscosity, and which comprises the steps of intimately admixing a calcium oxide-containing material such as quicklime and which has a water reactivity of from about 30° C. to about 44° C., preferably from about 31° C. to about 38° C., with a sufficient amount of liquid water to supply from about 5% to about 90%, preferably from about 10% to about 40%, depending upon the water reactivity of said lime and the viscosity level of said slaked lime so desired, by weight of that water required to theoretically completely hydrate said calcium oxide-containing material to form a free-flowing, partially prehydrated quicklime. The water is added uniformly to the quicklime in order to prevent local overheating, and the formation of lumps and/ or a paste. The water contacted-quicklime then undergoes an aging or sojourn time which is sufficient to insure the complete reaction between the water and the quicklime, such aging period being at least one minute, preferably, from about 3 minutes to about 30 minutes, and more preferably from about 5 minutes to about 15 minutes. Such aged prehydrated quicklime is then contacted with additional quantities of water (that is, substantially more than that amount of water which is required to complete the hydration of said quicklime) to form a wet-slaked lime having a total solids concentration of from about 10% to about 44%, preferably 15% to 30%, by weight, and which comprises an aqueous slurry having suspended therein substantially completely hydrated quicklime particles. The water, which is used to contact said partially prehydrated quicklime initially, and the resultant slurry are maintained at a temperature of from about 50° C. to about 100° C., preferably 55° C. to 75° C. The aforesaid slaked lime slurry is characterized by having a viscosity of less than 2500 centipoises, at 25° C. after aging one hour as measured by the test described herein.

As another embodiment of the present invention, there is provided a continuous process for preparing slaked lime which is characterized by having a viscosity of 2500 centipoises or less at 25° C., and which comprises the steps of continuously intimately admixing water and a calcium oxide-containing material such as quicklime and which has a water reactivity of from about 30° C. to about 44° C. to form a partially prehydrated, free-flowing quicklime, said water being used in an amount sufficient to supply from about 5% to about 90%, depending upon the water reactivity of said quicklime and the viscosity level of said slaked lime so desired, by weight of that water required to theoretically completely hydrate said quicklime. The resultant partially prehydrated quicklime is aged for approxiamtely 3 to 30 minutes and then said quicklime and additional quantities of water are continuously fed into a reaction zone which contains an agitated aqueous slurry comprising water and hydrated (slaked) quicklime, to form additional quantities of such hydrated quicklime, said slurry being continuously maintained at a temperature of from about 50° C. to about 100° C., preferably from about 55° C. to about 75° C. A portion of said aqueous slurry is continuously removed from said reaction zone at a rate such that the average sojourn time (that is, the average residence time) of a single particle of such slaked lime in said reaction zone is less than 60 minutes, preferably from about 15 to about 40 minutes. The removed portion of said slurry is then cooled to a temperature of less than 100° C. or to a temperature below the temperaure of the slurry in the reaction zone, preferably from about 5° C. to about 50° C. The resultant cooled slurry is characterized by having a viscosity of less than 2500 centipoises at 25° C., after at least one hour of aging as measured by the test hereinafter set forth.

As a further embodiment of the present invention, there is provided a process for preparing a highly stable dicalcium orthophosphate which is characterized by having a pH (as measured in a 10% aqueous slurry) which does not substantially change or drift over an extended period of time such as 3 hours. This process comprises the steps of contacting (in the manner heretofore set forth) a calcium oxide-containing material such as quicklime, which has a water reactivity of from about 30° C., to about 44° C., with a sufficient amount of water to supply from about 5% to about 90%, depending upon the water reactivity of said quicklime and the viscosity level of the slaked lime so desired, by weight of that water required to theoretically completely hydrate said quicklime. The average quicklime particle temperature during this initial prehydration step is maintained below 200° C. and preferably from about 100° C. to about 180° C. The resultant free-flowing partially, prehydrated quicklime after aging at the above described times is, then, contacted with an excess or additional amount of water to form slaked lime which comprises an aqueous slurry having suspended therein substantially completely hydrated quicklime particles. The water, which is initially used to contact said partially prehydrated quicklime, and the resultant slurry are maintained at a temperature of from about 50° C. to about 100° C. The resulting slaked lime (i.e. aqueous slurry) is then cooled to a temperature below 100° C., preferably from about 5° C. to about 50° C.; said slaked lime being characterized by having a "grit" content, hereinafter defined, of less than about 5% by weight, based on the total weight of the solids in the slurry. The cooled slaked lime is subjected to a separation step in order to remove the remaining "grit" present in the slurry, for example, a screening operation utilizing a U.S. Standard screen having a number not less than No. 250 mesh wherein the undesirable larger size particles, i.e. > about 65 microns in diameter, are separated from those particles (in the aqueous slurry) passing through such No. 250 mesh U.S. Standard screen. This cooled and screened slaked lime is characterized by having a viscosity of less than 2500 centipoises at 25° C. and has a grit content (hereinafter defined) of less than 1%, preferably substantially zero percent, by weight based on the total weight of the solids in said cooled slaked lime.

Such cooled lime slurry is then admixed with a dilute mineral acid such as phosphoric acid. This acid is present in an aqueous medium which is contained in a reaction zone or vessel. When the contents of the vessel are continuously maintained at a temperature of below 40° C., preferably from about 5° C. to about 38° C., during the reaction therein, the resultant dicalcium orthophosphate is present in the dihydrate form. By the same token, when the temperature is continuously maintained above 40° C., preferably from about 42° C. to 97° C., the resultant orthophosphate is in the anhydrous form. The phosphoric acid is used in an amount which at least theoretically completely reacts with all of said lime to convert to dicalcium orthophosphate.

The "lime," which is used as the starting material in the novel process of the present invention, is to be considered as a generic term for any calcium oxide-containing material (which also continues less than 5% by weight $Ca(OH)_2$) such as, for example, those limes generally known in the industry as high calcium and dolomitic quicklimes. The terms "lime" and "quicklime" are used interchangeably throughout this specification and refer to any calcined products having a sufficiently high CaO content to cause a chemical combination upon the addition of water resulting in the formation of calcium hydroxide, that is $Ca(OH)_2$. A high calcium quicklime, for example, may contain as much as 90 to 99% by weight CaO; a dolomitic quicklime, on the other hand, may contain from about 50 to about 60% by weight CaO, the remainder being composed of other metallic oxides, the majority of which, on a weight basis, is magnesium oxide, MgO, which is present in amounts of from about 45% to about 30% by weight based on the total weight of the quicklime.

As previously mentioned, the lime utilized in the novel processes of the present invention has a "water reactivity" of at least 30° C., generally from about 30° C. to about 44° C. and preferably from about 31° C., to about 38° C. These limes (30° C.–44° C.) fall within the category of "soft burned limes" which have been produced at low calcining temperatures, for example, less than 900° C., and generally by a process using a rotary kiln; however these soft burned limes can be produced by the aforedescribed vertical kiln. As heretofore noted, the "hard burned limes" which have a water reactivity of less than 30° C., that is, about 15 to about 30° C., generally yield a slaked lime which has a low, i.e., less than 2500 centipoises at 25° C., viscosity. Consequently, the aforementioned generic term "lime" does not include these "hard burned limes."

The size of the lime material used in the present invention novel processes is generally commercially available in the form of agglomerates or lumps (similar to spheres) which are less than about 2 inches in diameter. (Some of the commercially available limes have an agglomerate or lump size of from about ⅛ inch to about ⅜ inch, which size has been found to be quite satisfactory in both the prehydration and slaking steps.) It is preferred, however, that the lime material to be prehydrated have a lump size of less than about 2 inches in diameter in order, for example, to provide a greater contact surface area and thus reduce the prehydration time, particularly when said lumps are prehydrated at about 90% of that amount of water required to theoretically completely hydrate said material. However, lime lumps greater than 2 inches in diameter, e.g. 2–10 inches, can be utilized if so desired.

In conjunction with the partial prehydration step, it is important that the water added to the aforesaid calcium oxide-containing material, i.e. lime, be carried out in such a manner as to uniformly apply the water to said material. In other words, the water is added, for example, by means of spraying onto a moving bed of such material, in such manner as to prevent a local overheating and the formation of a paste type product and/or lumpy product. It is also within the scope of the present invention to add water (in the liquid form) to a stationary vessel containing the lime and frequently and/or continuously agitate the lime during the addition and also after the addition during the aging period.

In conjunction with the above-described prehydration step, it is necesssary to age the water contacted-material over an extended period of time, such as at least about one minute, preferably from about three minutes to about 30 minutes, more preferably, from about 5 minutes to about 15 minutes in order to insure the hydration thereof. It is to be understood that one of the cirtical features of the present invention is that the partially prehydrated must be in a free-flowing, dry-to-the-touch form prior to the final slaking step in order to achiever, after slaking, a wet-slaked lime product having the desired viscosity of less than 2500 centipoises at 25° C.

The amount of water utilized in the aforesaid prehydration step is sufficient enough to provide from about 5% to about 90%, preferably from about 10% to about 40%, by weight of the theoretcial amount of water required to completely hydrate said lime. The resulting partially prehydrated lime, then, is characterized by being free-flowing and dry to the touch.

As previously mentioned, the viscosity level of the end product, i.e. the slaked lime, can be predetermined and controlled by the degree of prehydration of a quicklime having a specific water reactivity. For example, if the quicklime has a water reactivity of about 31° C., a prehydration of about 10% will yield, after slaking, a viscosity level of about 400 to 600 centipoises at 25° C. By the same token, if the quicklime has a water reactivity of about 38° C., a prehydration of about 10% will yield, after slaking, a viscosity level of about 1800–2100 centipoises at 25° C. and generally it takes a 60% to 80% degree of prehydration to have a viscosity level of about 400 to about 600 centipoises at 25° C. Thus, one of the novel features of the present invention is the preparation of the slaked lime having a predetermined and controlled viscosity level.

The prehydration step (and the subsequent slaking procedure) is generally carried out at atmospheric pressure, i.e., about 15 p.s.i.a. If one so desires, however, the novel processes of this invention may be conducted at subatmospheric pressure, e.g., from about 3 to about 15 p.s.i.a., or at superatmospheric pressure, for example, 15–200 p.s.i.a., or greater.

The next step in the novel processes of the present invention relates to the slaking of the partially prehydrated lime by contacting such lime with an excess of water whereby the lime particles are then completely hydrated and are also suspended in an aqueous medium. Before the partially prehydrated lime is contacted with water, it is desirable that the water be preheated and maintained, during the addition to or incorporation therewith of the partially prehydrated quicklime, at a temperature of from about 50° C. to about 100° C., and more preferably at a temperature of about 55° C. to about 75° C. The amount of water utilized is such as to provide a total solids concentration in said aqueous medium of less than 45% by weight, based on the total weight of the final aqueous slurry, preferably from about 10% to 44%, and more preferably from about 15% to about 30% by weight. It should be understood that the total solids may contain (1) substantially only $Ca(OH)_2$ if the starting material is a high purity calcium lime or (2) a mixture of $Ca(OH)_2$ and MgO or $Mg(OH)_2$, possibly together with other metal oxides, if the starting material is Dolomitic lime. During the addition of the aforementioned partially prehydrated quicklime to the body of water, it is preferred that the resulting aqueous slurry be frequently, preferably continuously, agitated in order to provide a more uniform temperature control since the overall reaction is exothermic. Such agitation may be provided by any mechanical or manual means commonly known and utilized in the art.

After all of the partially prehydrated quicklime has been added to or incorporated within the above-described body of water in order to complete hydration of the partially hydrated lime particles and to form the aforementioned slurry, it is desirable that the agitation continue for a period of from about 10 seconds to about 10 minutes or more in order to insure the complete hydration of the lime.

It is desirable that, after the wet-slaked lime is formed according to the aforesaid processes, the slurry be cooled to a temperature of less than 100° C. or at a temperature below that temperature of the slurry in the reaction zone, preferably from about 5° C. to about 50° C.

It will be noted that the aforementioned descriptive matter relative to the present invention has been directed generally to a batchwise process; however, the processes of the present invention can be carried out in a continuous manner as briefly referred to hereinbefore. Specifically, in a continuous process of the present invention, the lime or quicklime is continuously contacted with the liquid water in the amounts hereinbefore described in order to produce a partially prehydrated, free-flowing quicklime, such amounts of water being similar to the amounts enumerated in the (prehydration step) description of the aforementioned batchwise process. After aging (which can be accomplished, for example, by merely continuously conveying the lime from the prehydration vessel to the slaking vessel) such presydrated lime under the conditions heretofore set forth, this partially prehydrated quicklime and additional quantities of water are then continuously fed into a reaction zone which contains an aqueous slurry (hereinafter more specifically defined) containing water and substantially completely hydrated quicklime to form additional quantities of said hydrated quicklime therein. The temperature of the aqueous slurry contained in said reaction zone is continuously maintained at from about 50° C. to about 100° C., preferably from about 55° C. to about 75° C. Thus, new particles of substantially completely hydrated lime, i.e., calcium hydroxide, are continuously being formed in the reaction zone. The individual lime and water feed rates to such reaction zone are controlled in order to provide a solids concentration therein of approximately the same concentration which it is desired that the portion of end product slurry contain and which is continuously discharged in the manner hereinafter set forth. Specifically, the concentration of the aqueous slurry is maintained at less than about 45% solids by weight based on the total weight of the slurry, preferably from about 10% to about 44%, and more preferably from about 15 to about 30% by weight solids. As in the case of the batch process previously described herein, the total solids includes not only $Ca(OH)_2$ (which is expressed as CaO) as such would be the case when 99% high calcium lime is used as the starting material, but also other materials such as MgO or $Mg(OH)_2$ if, for example, Dolomitic lime is used as the starting raw material.

With reference to the aforementioned water and lime feed rates to a reaction vessel, sometimes referred to in the art as a "slaker," it is, of course, apparent that these feed rates are substantially flexible values predicated upon, for example, the size of the reaction vessel, the size of the discharge means such as an overflow pipe, and the like. Such feed rates are easily ascertainable by one of ordinary skill in the art to which this invention pertains.

With the continuous addition of the partially prehydrated quicklime and the additional amounts of water to said reaction zone, there is concurrently discharged or removed from the reaction zone a portion of aqueous slurry of hydrated lime, preferably at rates such as to maintain a constant volume of slurry in the reaction zone. It is preferred that the removal of such portion of the aqueous slurry be at a point somewhat distant from the points of addition of said water and the partially prehydrated quicklime in order that the incoming partially prehydrated quicklime particles may have an opportunity to completely react with the water and thus become completely hydrated to form calcium hydroxide or slaked lime prior to removal from the reaction zone. As in the case of the batch process, it is also desirable that the aqueous slurry in the reaction zone be frequently or continuously agitated during this slaking step.

The resultant product (that is, an aqueous slurry containing hydrated lime particles) of this continuous process is also characterized by having a predetermined and controlled viscosity level of less than 2500 centipoises at 25° C. This viscosity is determined at a slurry temperature of 25° C. and at a 17%, by weight, CaO concentration, after aging for approximately one hour, by a model RVT Brookfield Viscosimeter using spindles having a designation of No. 1 through No. 4, depending upon the viscosity level. For example, a No. 4 spindle measures viscosity values of from 2000 to about 10,000 centipoises. As previously mentioned, the viscosity is usually within the range of from about 100 to about 2000 centipoises at 25° C. as determined by the aforesaid test. The aforementioned viscosity values are predicated, as previously mentioned, on a slurry which has aged for a period of at least one (1) hour. However, another one of the distinguishing features of the present invention is that the aging time beyond one hour has very little effect; for example, aging for from about 1 hour to about 100 hours at substantially constant temperature results in substantially the same viscosity value as that obtained at one hour. For example, it was found that the slaking of lime using excess water and a calcium oxide-containing material, that is, soft burned lime (37° C. water reactivity), which had not been subjected to a partial prehydration step, resulted in a slurry which initially had a viscosity of 3100 centipoises at 25° C. and at a 17% CaO level, and which upon standing for about 1 hour doubled its viscosity value, that is, to about 6,200 centipoises at 25° C., as measured by the aforementioned test. By the same token, when a resultant slurry was prepared from the same calcium oxide-containing material, but which had been partially prehydrated (12%), said slurry had an initial viscosity of 1750 centipoises at 25° C. and at a 17% CaO level. Furthermore, this latter slurry viscosity was substantially stable over a long period of time, that is, the viscosity did not, in effect, substantially increase over a period of time, i.e. such as about from 1 to about 100 hours or longer. This latter viscosity value was approximately 1,800 centipoises at 25° C. after 40 hours aging.

In practicing this invention, it was observed that the viscosity of a slaked lime prepared from a partially prehydrated lime always was substantially lower than the viscosity of a slaked lime prepared from a non-partially prehydrated lime, even when the viscosities of both slaked limes (having equal temperature and solids concentration) were measured immediately after hydration was complete. However, for purposes of comparison, it was found that the viscosity measurements were more accurate and reproducible when made after approximately one hour's aging or standing at 25° C.

The pH of the slaked lime at 25° C. is above 10 at even the lowest $Ca(OH)_2$ concentrations, e.g. 1% (as CaO). This pH at 25° C. is generally from about 11 to about 13 corresponding to a total solids concentration of the slaked lime of 10% to about 44% by weight; the solubility of hydrated lime decreases as the temperature increases. Additional pH information may be located in Chemical Lime Facts, Bulletin 214, p. 33, reprinted in 1964 by the National Lime Association of Washington, D.C., said bulletin being incorporated herein by reference in order to avoid the unnecessary enlargement of the present specification.

As previously mentioned in the earlier part of the specification, another facet of the present invention relates to the preparation of dicalcium orthophosphate, either in the anhydrous or dihydrate form (or a mixture of these two forms), which has an improved stability as measured by its pH over an extended period of time. The reaction of water, orthophosphoric acid and an aqueous lime slurry in the preparation of dicalcium orthophosphate is well known in the art as exemplified by U.S. Pats. 3,065,053; 3,236,593 and 3,334,979, all of which references are incorporated herein by reference. It is disclosed in U.S. 3,334,979 that dicalcium orthophosphate dihydrate is produced when the reaction temperature of the mixture of the aforementioned ingredients is maintained below about 40° C. during the entire reaction time and the anhydrous form is prepared when the temperature is above 40° C. A mixture of the dihydrate and anhydrous forms can be prepared during the overall reaction if the temperature is increased or decreased when respectively at either below or above 40° C. In conjunction with the preparation of these dicalcium orthophosphates, such as $CaHPO_4 \cdot 2H_2O$, one of the problems in the utilization of dicalcium orthophosphate produced by the prior art processes is that such material will substantially change in its pH characteristics over an extended period of time such as 3 or 4 hours and thus when incorporated, for example, in a toothpaste formulation, will prove to be unstable wtih the other ingredients incorporated therein.

The aforementioned pH problem has been substantially overcome by certain limitations and the addition of further operating steps to the novel processes (heretofore described) of the present invention of preparing a wet-slaked lime having a viscosity less than 2500 centipoises at 25° C. More specifically it was also unexpectedly discovered that when the heretofore described prehydration step is conducted at a temperature below 200° C., but not less than 0° C., and preferably from about 100° C. to about 180° C., the resultant slaked lime will have a "grit" (hereinafter defined) content of less than 5%, based on the total weight of the solids in the slaked lime. The grit content of the slaked lime slurry is preferably further reduced to less than 1%, and preferably substantially zero percent, content by screening the slaked lime slurry. This separation process is preferably carried out by the use of a No. 250 mesh U.S. Standard screen (which has openings of about 60 microns in diameter) whereby the "grit" particles are removed from the (slaked lime) aqueous slurry. It was also found during the experimentation on the present process, that when the prehydration temperature was not controlled, i.e. rose above 200° C., the resultant slaked lime had a grit content greater than 5% by weight and as high as 40% by weight. Under such circumstances even the aforesaid screening step was inefficient and inoperative in that the screen plugged quite frequently. As a practical matter then, the preparation of slaked lime having less than 5% by weight grit is not feasible if the prehydration temperature is above 200° C. because the subsequent screening step is relatively inoperative.

It is to be understood that the term "grit" as used herein refers to substantially hard particles of calcium hydroxide, a mixture of calcium oxide and calcium hydroxide, a mixture of calcium oxide and silicon, or a mixture of calcium oxide and other metals or metal oxides such as $MgO$, $Fe_2O_3$, $Al_2O_3$ and $SiO_2$, or a combination of any of said materials. Furthermore, this grit is also characterized by having a particle size diameter which is greater than 60 microns, and is generally in the range of from about 65 to about 120 microns, i.e. is composed of particles (65–120 microns) which do not pass through a number 250 mesh U.S. Standard screen.

In conducting the aforesaid prehydration step at the aforementioned temperature limitations of less than 200° C., it was noted that the reaction between water and lime is an exothermic one and consequently this factor should be considered during the prehydration step. For example, when calcium carbonate (limestone) is calcined, i.e. heated to drive off $CO_2$ to produce calcium oxide, the resultant calcium oxide usually has a temperature substantially above 200° C. Thus, it is necessary to cool this calcium oxide down in order to maintain and/or control the calcium oxide at a temperature below 200° C. during the prehydration step. In other words, if this prehydration temperature upper limit of about 200° C. is exceeded, grit is formed in substantial amounts, i.e. greater than 5% and as high as 40% by weight based on the total weight of the material. If the resultant partially prehydrated lime, which has been subjected to a prehydration temperature greater than 200° C., is slaked, the resultant slurry will also be characterized by having this grit. It is to be understood, then, that this upper limit of about 200° C. for the prehydration step is quite critical in maintaining the grit formation within the desired range, i.e. lower than the maximum level of 5% in order to subsequently effectively screen the slaked lime (aqueous slurry) and thus utilize such slaked lime in the production of dicalcium orthophosphate dihydrate or anhydrous dicalcium orthophosphate.

As a specific embodiment of the present invention there is provided a process for preparing dicalcium orthophosphate which is characterized as being highly stable, as measured by its relatively insignificant pH drift, for use, for example, in dentifrice formulations. More specifically, this process comprises intimately and uniformly contacting water with lime which has a water reactivity of from about 31° to about 38° to form a free-flowing, partially hydrated lime. The water is used in an amount of from about 10% to about 40% by weight of the theoretical amount of water required to theoretically completely hydrate such lime and the manner of contact is similar to that described in the earlier part of the specification. For example, this controlled prehydration step can be accomplished by spraying the water onto a moving bed of lime and concurrently blowing cool air up through said bed in order to maintain the lime particle temperature between 100° C. and 180° C. The aforesaid partially prehydrated free-flowing lime, after aging in the manner heretofore described, is then contacted with an excess of water (that is greater than the amount of water required to complete the hydration of said lime) to form slaked lime which comprises an aqueous slurry having suspended therein particles of substantially completely hydrated lime. The water utilized in the aforementioned slaking step and the resulting aqueous slurry having temperature which is continuously maintained at from about 55° to 75° C. The resulting slaked lime is characterized by having a viscosity of from about 100 to about 2000 centipoises at 25° C. as measured by the test herein set forth and has a grit content of less than 5% by weight, based on the total weight of the solids in the above-described slurry. The above-described freshly prepared wet slaked lime is then cooled to a temperature of from about 5° C. to about 50° C. This cooled slaked lime is screened on a No. 250 mesh U.S. Standard screen and is then contacted with phosphoric acid (also commonly referred to as orthophosphoric acid) contained in an aqueous medium to form dicalcium orthophosphate dihydrate which precipitates in said medium. The slaked lime and phosphoric acid contained in said aqueous medium are all maintained at a temperature less than 40° C. during the entire reaction period during which the aforesaid dihydrate material is formed. The amount of phosphoric acid utilized in reacting with the slaked lime is that molar quantity which at least theoretically completely reacts with substantially all of slaked lime to convert said lime to the dihydrate material.

While the above-described specific embodiment refers to the preparation of dicalcium orthophosphate dihydrate, it is also within the scope of the present invention to prepare dicalcium orthophosphate in the anhydrous form by maintaining the above-described phosphoric acid containing aqueous medium at a temperature above 40° C. during the conversion of such lime to the anhydrous material. Furthermore, it is also within the scope of the present invention that the slaked lime (produced by the novel processes of the present invention and including the step of maintaining the lime temperature below 200° C. during prehydration) can be used to prepare a mixture of the dicalcium orthophosphate in the dihydrate form and in the anhydrous form according to those processes set forth in the aforedescribed patent U.S. 3,334,979. Furthermore, it is also within the scope of the present invention to prepare tricalcium phosphate and monocalcium phosphate from said slaked lime and phosphoric acid.

A further understanding of the novel processes of the present invention will be obtained from the following examples which are intended to illustrate the invention, but not to limit the scope thereof, parts and percentages being by weight unless otherwise specified.

EXAMPLE I

Ten separate and individual batches (designated Numbers 1–10) of slaked lime were prepared under the process conditions set forth in Table I by admixing 460 grams (dry basis) of quicklime (see footnotes 5 and 6—Table I for chemical analyses) with 2250 grams of water, which had been previously preheated to the temperature indicated in Table I under "Slurry Temperature," in a one gallon reactor vessel provided with an overflow pipe. This vessel was also provided with a heat transfer jacket which permitted the temperature control of the reactor vessel contents by passing heated or chilled water through the jacket.

Of the ten aforesaid batches, the batches designed Nos. 2, 4, 7 and 9 were processed according to one embodiment of the present invention which relates to the preparation of a slaked lime which had a controlled and predetermined viscosity below 2500 centipoises at 25° C. and at about a 17% CaO level. The batches designated Nos. 3, 5, 8 and 10 were processed according to another embodiment of the present invention which relates to the preparation of a slaked lime which has the aforementioned viscosity characteristics and a grit content of less than 5% (before screening) by weight based on the total weight of the solids in the slaked lime. More specifically, the separate and individual 460 gram (dry basis) batches of quicklime (i.e. Batch Nos. 2–5 and 7–10) were each partially prehydrated by admixing said quicklime with a sufficient amount of water (i.e. prior to and in addition to the 2250 grams previously mentioned) to yield the degree of prehydration indicated in Table I. (For example, in Batch No. 2, 460 grams of quicklime were intimately admixed with 59.2 grams of water in order to achieve a 40% degree of prehydration and then the resultant prehydrated quicklime was contacted with 2250 grams of water.) This admixing was accomplished in a laboratory size (4" I.D.), longitudinally extending, cylindrical rotary mixer equipped with a single blade mechanical agitator which permitted the inside peripheral surface of said mixer to be wiped clean during the rotation of the agitator. The water for prehydration was uniformly sprayed as a fine mist over a period of from 1 to 5 minutes (depending upon the degree of prehydration) onto the quicklime by means of a ⅛" tube partially extending into the interior of said mixer. The utilization of a fine mist to prehydrate the aforementioned separate and individual batches over the aforesaid temperature period was conducted in order to control and achieve a specific reaction temperature of the particles being treated. In the case of Batch Nos. 2, 4, 7 and 9, the water for prehydration was added continuously over a period of only about 30 seconds and the average quicklime particle temperature rose above 200° C. to the temperature listed in Table I. By the same token, in Batch Nos. 3, 5, 8 and 10, the water for prehydration was added intermittently over a period of 5 minutes and the average quicklime particle temperature was maintained at a temperature less than 200° C.—see those values listed in Table I. The resultant partially prehydrated quicklime in each case was a free-flowing, dry-to-the-touch, material.

Both the prehydrated quicklimes (Batch Nos. 2–5 and 7–10), which were aged for a period of approximately 3 minutes, and the non-prehydrated quicklimes (Batch Nos. 1 and 6) were separately fed into individual batches of approximately 2250 grams of water contained in the above-described one-gallon reaction vessel which was open to the atmosphere during the entire slaking period. During the addition of the aforesaid quicklime to the water (which addition was completed in approximately seconds) and for a 3 minute period thereafter, the water and resultant slurry were continuously agitated by a single blade mixer (commercially available under the trade name Lightin Mixer and which had a shaft speed of 900 r.p.m.) in order to insure complete hydration and to dissipate the heat evolved from the exothermic reaction due to the hydration of said quicklime. The reaction vessel contents were held at the temperatures indicated in Table I by passing cooling water through the reactor jacket during the slaking period and the subsequent aforesaid 3 minute period. After each batch of wet slaked lime was prepared, the resultant slurry temperature was adjusted to approximately 25° C., by passing additional cooling water through the reactor jacket. The 25° C. slurry was then aged for a period of approximately one hour in the vessel after which time a portion of the batch was removed and the viscosity and grit content thereof were determined. The viscosity was measured by a Brookfield Viscosimeter, Model RVT using Nos. 1 through 4 Spindles at 10 r.p.m. The grit content was determined by screening a portion of the resultant slurry through a No. 250 mesh U.S. Standard screen. Furthermore, the average particle size of the grit in each of the Batches Nos. 1 through 10 was found to be 95 microns; the grit particle size range was from 75 microns to 120 microns. (The slaked lime particles had an average particle size of 8 microns and a range of from 2–14 microns.)

The conditions used and the results obtained for the ten batch processes for preparing slaked lime are set forth in Table I. It will be noted that in Batch Nos. 1 and 6 the quicklime utilized was not prehydrated. Consequently, the quicklime particle temperature is not listed; however, the temperature of the quicklime fed to the aforesaid reaction vessel was approximately 20° C. In Batch Nos. 2, 4, 7 and 9, the respective quicklime batches were prehydrated to the degree shown in Table I but the respective particle temperatures were all above 200° C. In these Batches, Nos. 2, 4, 7 and 9, the resultant slurry viscosity was significantly less than the viscosity of Batch Nos. 1 and 6 wherein there was no prehydration. Furthermore, the effect of the degree of prehydration on the viscosity of the resultant slaked lime produced from the different types of quicklimes, i.e. one had a 33° C. water reactivity and the other had a 37° C. water reactivity, is also quite apparent. Thus, the preparation of a slaked lime having a predetermined and controlled (in addition to low) viscosity is quite feasible when practicing the processes described herein and as represented by the examples herein.

In Batch Nos. 3, 5, 8 and 10, the quicklime particle temperature was maintained below 200° C. during the prehydration step and consequently the respective slaked lime products were each characterized by having a significantly lower grit content (in addition to a low viscosity value) as contrasted to the grit content of Batch Nos. 2, 4, 7 and 9 which were characterized by having a high grit content, i.e. greater than 5%, but having a low viscosity value. Consequently, the effect of controlling the quicklime particle temperature during the prehydration step is quite apparent in conjunction with the grit content of the resultant slaked lime product.

In regard to Batches 6 through 10, it will be noted that the type of quicklime used was Dolomitic which is a low calcium oxide containing material and which had a 33° C. water reactivity vs. a 37° C. water reactivity for the high calcium quicklime utilized in Batch Nos. 1 through 5.

The average pH of Batches 1 through 10 was approximately 12.3 with a pH range of from 11.4 to 13.1.

In order to point out the distinctions between the processes of the present invention and the prior art, the two-step method of preparing a dry, hydrated lime (but not a wet slaked lime) as described in U.S. Pat. 1,871,530 (p. 1, left-hand column, lines 40 through 50, and right-hand column, lines 51 through 61) was repeated. More specifically, approximately 24% of the total water which is required to completely hydrate a quicklime was added (all at one time) to a container containing a quantity of "soft burned" quicklime which had a water reactivity of approximately 37° C. The resultant material was thoroughly mixed with a spatula for approximately 5 minutes and then the temperature of said material was measured to be approximately 213° C. The resultant product was also characterized by being somewhat lumpy

TABLE I

| Batch No. | Type quicklime | Water reactivity, °C. | Degree of prehydration, percent [1] | Quicklime particle temperature, °C.[2] | Slurry temperature, °C.[3] | Slurry viscosity [4] | Slurry concentration (CaO), percent | Slurry grit content, percent |
|---|---|---|---|---|---|---|---|---|
| 1 | High Calcium [5] | 37 | 0 | | 70 | 5,150 | 16.4 | 2.0 |
| 2 | do | 37 | 40 | 280 | 70 | 1,210 | 16.4 | 21 |
| 3 | do | 37 | 40 | 120 | 70 | 1,270 | 16.6 | 3.0 |
| 4 | do | 37 | 80 | 300 | 70 | 485 | 16.5 | 32 |
| 5 | do | 37 | 80 | 120 | 70 | 450 | 16.5 | 4.5 |
| 6 | Dolomitic [6] | 33 | 0 | | 70 | 3,510 | 17.2 | 3.1 |
| 7 | do | 33 | 20 | 220 | 70 | 940 | 16.9 | 16.3 |
| 8 | do | 33 | 20 | 110 | 70 | 930 | 17.1 | 2.1 |
| 9 | do | 33 | 90 | 350 | 70 | 260 | 17.3 | 37.7 |
| 10 | do | 33 | 90 | 140 | 70 | 250 | 17.1 | 4.9 |

[1] Based upon the theoretical amount of water, by weight, required to completely hydrate the quicklime.
[2] Temperature of quicklime particle after prehydration, if partially prehydrated.
[3] Initial water temperature prior to slaking and slurry temperature during slaking.
[4] As measured by a Brookfield Viscosimeter, Model RVT, Nos. 1 through 4 spindle at 10 r.p.m., at 25° C. after aging 1 hour.
[5] Analyses of high calcium quicklime:
CaO, 96.1.
MgO, 1.8.
$SiO_2$, 1.0.
$Fe_2O_3$, .1.
$Al_2O_3$, .1.
$H_2O$, .2.
$CO_2$, .7.

Particle size distribution (U.S. standard screen):
+No. 4 mesh, 1.0% by weight.
+No. 8 mesh, 60.0% by weight.
+No. 200 mesh, 37.0% by weight.
−No. 200 mesh, 2.0% by weight.

[6] Analyses of Dolomitic quicklime:
CaO, 57.3.
MgO, 39.5.
$SiO_2$, 1.4.
$Fe_2O_3$, .2.
$Al_2O_3$, .2.
$H_2O$, .4.
$CO_2$, 1.0.

Particle size distribution (U.S. standard screen):
+No. 4 mesh, 3.6% by weight.
+No. 8 mesh, 82.0% by weight.
+No. 200 mesh, 10.5% by weight.
−No. 200 mesh, 3.9% by weight.

in appearance notwithstanding the above-described agitation. The above-described material was allowed to cool for approximately two hours and then the remainder, 76%, of the water required for the complete hydration of the above-described resultant material, was added (all at one time) thereto. During this second water addition and for a period of approximately 5 minutes thereafter, the overall physical admixture was continuously agitated. The two water additions, which were made in order to completely dry hydrate the quicklime, produced a dry hydrated lime which was characterized by containing small size lumps of approximately ¼" diameter (of a spherical shape). This 100% completely dry hydrated quicklime was then added with agitation to a sufficient quantity of water in order to prepare a 17% (expressed as CaO) aqueous slurry of lime. This aqueous slurry which initially had a temperature of 65° C. was then cooled by means of an ice bath to approximately 25° C. and then after aging for one hour, a portion was analyzed for its grit content and a viscosity determination made thereon. The viscosity of the above-described slurry was found to be 4150 centipoises as measured at 25° C. by the procedure utilized in the above-described Example I of the present specification. Furthermore, the grit content, as determined by a screening analysis, was found to be 19.6% by weight based on the total weight of the solids in the above-described slurry. While the specification of U.S. 1,871,530 does not disclose the preparation of a wet slaked lime but only points out and teaches a method for preparing a 100% hydrated lime with no excess water, i.e. a "dry-slaked" lime, the above-described step relating to the preparation of the 17% slurry was necessary in order to effectively compare the viscosity of the lime of the above-described U.S. patent with the viscosity level of the wet slaked lime produced by the processes of the present invention. It can readily be seen that the above-described U.S. patent does not in fact teach, suggest and/or make obvious the novel processes of the present invention.

U.S. 3,305,311 describes a "dry-slaking" process which comprises in general the immersion of a quantity of lime particles, as by dipping in a bath of a slaking liquid comprised essentially of water, for a period of time sufficient both to absorb an amount of water required for hydration and to absorb an amount of water to dissipate at least a substantial portion of the heat of reaction as latent heat of evaporation of water when subsequently withdrawn from the slaking liquid without significant breakdown in size of the particles while immersed. In order to point out the differences and distinctions between the processes of the present invention and the process of this patent, Example 1 of U.S. 3,305,311 was repeated using "soft burned" lime particles which had a water activity of about 37° C. The resultant temperature of the dry-slaked material was measured to be approximately 136° C. which is contrasted to the 135° C. obtained as stated Example 1 of said patent. A portion of the dry-slaked lime was then added to a sufficient quantity of water contained in a vessel in order to obtain a 17% (pressed as CaO) aqueous slurry of lime. The resultant aqueous slurry was thoroughly agitated and then a portion thereof was removed and the grit content and viscosity thereof obtained. While the grit content of the above-described aqueous slurry was determined to be about 5.5% by weight, based on the total weight of the solids of said slurry, the viscosity of the material was found to be approximately 5800 centipoises as measured at 25° C. (The temperature of the water initially utilized to prepare the above-described slurry was 65° C., however, after the slurry had been prepared, it was cooled in an ice bath to approximately 25° C. and then aged for one hour in order to determine the viscosity of a portion thereof.) In view of the results obtained from the repeat of the Example 1 of U.S. 3,305,311, it is vividly apparent that the processes of this patent neither teach nor suggest to one having skill in the art the preparation of slaked lime (i.e. a wet-slaked lime) which is characterized by having a predetermined and controlled viscosity of less than 2500 centipoises at 25° C. and a grit content of less than 5% by weight.

EXAMPLE II

Thsi example illustrates a continuous wet-shaking process of the present invention. Other continuous runs, outside the scope of this invention, are presented for comparative purposes. Ten runs, designated Run Nos. 11 through 20 (see Table II) were conducted utilizing the one-gallon reaction vessel described in the foregoing Example I of the present specification. In Run Nos. 11 through 15, the quicklime utilized was the high calcium which was the same material initially utilized in Batch Nos. 1 through 5 of the foregoing Example I of the present specification. In Run Nos. 16 through 20, the quicklime utilized was the Dolomitic type which was the same material initially utilized in the Batch Nos. 6 through 10 of the foregoing Example I of the present specification. In Run Nos. 11 and 16, the quicklime material was not prehydrated whereas in Run Nos. 12 through 15 and 17 through 20, the quicklime used was continuously prehydrated as described in the following paragraph.

The partial prehydration of the lime used in Runs 12 through 15 and 17 through 20 was carried out in a continuous manner by continuously feeding the quicklime material into a laboratory size (i.e. 4" I.D. by 28" in length), longitudinally extending rotary mixer) as described in the foregoing Example I) equipped with a water pipe extending partially into said mixer. This pipe was so designed as to spray water either as a fine mist over an extended longitudinal distance of the pipe or as ⅛" diameter droplets (spherical in form) onto the quicklime upon entering the aforesaid mixer. The mixer was rotated at approximately 10 r.p.m. The slow rotation of this mixer, in addition to the adding of the aforementioned water just after the quicklime entered the mixer, permitted an aging time of about two minutes prior to the quicklime being discharged. The amount of water used was sufficient to partially prehydrate said quicklime to the degree indicated in Table II. The amount of quicklime utilized was sufficient to provide, when concurrently added with additional amounts of water, a 17% (expressed as CaO) slaked lime aqueous slurry in the one-gallon reaction vessel with a sojourn particle time as indicated in Table II, and a 60 minute continuous process. The discharged portion of the mixer was positioned immediately above the reaction vessel. (The non-prehydrated quicklime of Run Nos. 11 and 16 was continuously fed into said vessel by means of a two inch I.D. screw conveyor.)

Initially, the one gallon reaction vessel was filled with a 17% (expressed as CaO) aqueous slurry of wet slaked lime in order to provide the initial heel for the incoming reactants which in this case constitutes either the partially prehydrated quicklime or non-prehydrated quicklime, and additional amounts of water. These reactants were fed to the reaction vessel, as previously mentioned, (said vessel being opened to the atmosphere) in amount sufficient to maintain approximately a 17% (expressed as CaO) slurry of the wet slaked lime in the vessel. During the addition of the reactants, the reaction vessel contents were continuously mechanically agitated (by a single blade mixer commercially available under the trade name Lightin Mixer and which had a shaft speed of 900 r.p.m.) in order to insure complete hydration and the adequate dissipation of heat due to the exothermic reaction and to aid in the continuous removal of part of the slurry from the reaction vessel through the aforementioned over-flow pipe. The average residence time of the particles was calculated to be approximately 25 to 30 minutes—see Table II.

A portion of the resultant slurry in the above-described reaction vessel was continuously discharged via the overflow pipe. The temperature of the discharged portion was then adjusted to about 25° C. by passing said discharged portion through a second vessel provided with a heat transfer jacket. This 25° C. (discharged) slurry of slake lime was then allowed to age for approximately one hour and the viscosity concentration and grid content thereof were determined in the manner set forth in Example I of the present specification.

the high calcium quicklime utilized in Run Nos. 11 through 15.

The average pH of Run Nos. 16 through 20 was approximately 11.8 with a pH range of from about 10.9 to 12.9.

TABLE II

| Run No. | Type quicklime | Water Reactivity, °C. | Degree of prehydration, percent [1] | Quick lime particle temperature, °C.[2] | Slurry temperature, °C.[3] | Average residence time, min.[4] | Slurry viscosity [5] | Slurry concentration, (CaO), percent | Slurry grit content, percent |
|---|---|---|---|---|---|---|---|---|---|
| 11 | High calcium [6] | 37 | 0 | | 63 | 25 | 5,150 | 17.1 | 2.9 |
| 12 | do | 37 | 25 | 214 | 64 | 26 | 1,430 | 16.9 | 14.7 |
| 13 | do | 37 | 25 | 115 | 65 | 25 | 1,415 | 5.8 | 2.5 |
| 14 | do | 37 | 68 | 305 | 64 | 26 | 620 | 16.2 | 39.7 |
| 15 | do | 37 | 68 | 117 | 65 | 25 | 605 | 16.1 | 3.1 |
| 16 | Dolomitic [7] | 33 | 0 | | 63 | 30 | 3,500 | 17.2 | 3.1 |
| 17 | do | 33 | 18 | 208 | 61 | 31 | 970 | 16.8 | 18.7 |
| 18 | do | 33 | 18 | 103 | 65 | 30 | 940 | 16.9 | 2.4 |
| 19 | do | 33 | 81 | 323 | 64 | 29 | 390 | 16.1 | 29.9 |
| 20 | do | 33 | 81 | 143 | 65 | 30 | 345 | 16.1 | 4.2 |

[1] Based upon the theoretical amount of water, by weight, required to completely hydrate the quicklime.
[2] Temperature of quicklime particle after prehydration, if partially prehydrated.
[3] Initial water temperature prior to slaking and slurry temperature during slaking.
[4] Average period of time each particle of quicklime remained in the reaction vessel.
[5] As measured by a Brookfield Viscosimeter, Model RVT, Nos. 1 through 4 Spindles at 10 r.p.m., at 25° C. after aging 1 hour.
[6] Same as footnote (5), Table I.
[7] Same as footnote (6), Table I.

The conditions used and the results obtained for the ten continuous process runs for preparing slaked lime are set forth in Table II. It will be noted that in Run Nos. 11 and 16 the quicklime utilized was not prehydrated. Consequently, the quicklime particle temperature is not listed; however, the temperature of the quicklime fed to the aforesaid reaction vessel was approximately 20° C. In Run Nos. 12, 14, 17 and 19, the respective quicklime batches were prehydrated to the degree shown in Table II; however, the respective particle temperatures were all above 200° C. since the water as in the form of the aforesaid drops and thus the temperature rose rapidly. In Runs 12, 14, 17 and 19 (wherein a prehydration step was used) the resultant slurry viscosity was significantly less than the viscosity of Run Nos. 1 and 6 wherein there was no prehydration. The effect of the prehydration step is quite apparent, then, when contrasting Run Nos. 12, 14, 17 and 19 with Run Nos. 1 and 6. The viscosity values of the slaked lime slurries produced from the different type limes and the degree to which they were prehydrated is also apparent.

In Run Nos. 13, 15, 18 and 20, the quicklime particle temperature was maintained below 200° C. during the prehydration step by the use of the fine mist of water and external cooling (which controlled the temperature) according to the procedure of Example I. Consequently, the respective slaked lime products were each characterized by having a significantly lower grit content, i.e. less than 5% by weight (in addition to a low viscosity value), as contrasted to the grit content of Run Nos. 12, 14, 17 and 19 which were characterized by having a high grit content, i.e. greater than 5% by weight, but having a low viscosity value. More specifically, the average particle size of the lime particles in each of the Run Nos. 13, 15, 18 and 20 was found to be 7 microns and the range of these runs was between 1 and 13 microns. In Run Nos. 12, 14, 17 and 19, the average particle size of the grit was found to be approximately 100 microns; the grit particle size range in these runs was from 88 microns to 112. Thus, the effect of controlling the quicklime particle temperature during the prehydration step is quite apparent in conjunction with the grit content of the resultant slaked lime product.

In regard to Runs 16 through 20, it will be noted that the type of quicklime used was Dolomitic which is a low calcium oxide containing material and which had a 33° C. water reactivity vs. a 37° C. water reactivity for

EXAMPLE III

This example demonstrates the effect of the grit content in the wet-slaked lime which is subsequently reacted with phosphoric acid to prepare dicalcium orthophosphate dihydrate. Two hundred gram samples of Batch Nos. 2 and 3 of the foregoing Example I of the wet-slaked lime were respectively and separately reacted with sufficient amounts of phosphoric acid in an aqueous slurry in order to prepare dicalcium orthophosphate dihydrate. The 200 gram sample of Batch No. 2 was not screened since it was desired to test a wet slaked lime slurry which would be representative of the prior art. However, the portion of Batch No. 3 was screened through a No. 250 mesh U.S. Standard screen even though its grit content was 3.0% after the initial preparation thereof. The overall reaction was carried out at a temperature less than 40° C., more specifically, 38° C. in order to only prepare the dihydrate form. During the admixture of the wet-slaked lime samples from Batch Nos. 2 and 3 and the phosphoric acid, the overall resultant mixture was continuously agitated and also for a period of 5 minutes thereafter in order to insure complete interaction. The two resultant dihydrate material samples formed in the respective slurries were then allowed to stand over a period of 3 hours and the pH of each slurry was periodically measured and recorded. (As previously mentioned, a pH change is undesirable when said dihydrate material is utilized, for example, in a toothpaste composition because such a change may, for example, render the taste thereof unpleasant and also chemically attack the tube containing said composition.) With reference to the dicalcium orthophosphate dihydrate which was formed from the wet-slaked lime of Batch No. 2 wherein the grit content was 21%, the pH drift or increase over a period of three hours was approximately 1.4 which it is believed indicated that there was not a complete reaction with the phosphoric acid, i.e., "free" lime from the grit was still present in the dihydrate material and thus periodically reacted with the phosphoric acid to cause the pH change. In conjunction with the dicalcium orthophosphate dihydrate which was prepared from the wet-slaked lime of Batch No. 3 wherein the grit content was substantially 0%, no pH drift was detected. In other words this dihydrate material did not have a pH drift or change over said time. Thus, in the absence of any grit there was a substantially complete reaction between the wet-slaked lime prepared from Batch No. 3 of the foregoing Example I of the present specification and the phosphoric acid.

In view of the subject matter set forth immediately above, it can readily be seen that (as another embodiment of the present invention) it is imperative during the prehydration of the quicklime that the average particle temperature be maintained at a temperature of less than 200° C. in order to prepare a wet-slaked lime which not only has a low viscosity value, i.e., less than 2500 centipoises at 25° C., but which also is characterized by having a grit content of less than 5% by weight (before screening), based on the total weight of the solids in the wet-slacked lime slurry. The prior art, then, as represented by U.S. Pats. Nos. 1,871,530 and 3,305,311 has, in essence, been unable to achieve a wet-slaked lime having a low viscosity (i.e. less than 2500 centipoises at 25° C.) or a wet-slaked lime having a combination of low viscosity and low grit content as described and claimed in the present specification and which latter-mentioned wet-shaqed lime can be utilized to prepare a stable, i.e. pH drift-free dicalcium orthophosphate.

In view of the aforementioned results of Examples I, II and III, it can readily be seen, then, that the novel processes of the present invention yield a wet-staked lime which is characterized by having a low (and predetermined and controlled) viscosity over an extended period of time, thus permitting easy handling in a processing operation, a substantial reduction (even before the screening step) in grit content (when the prehydration temperature is maintained below 220° C.), and a wet-slaked lime which is capable of substantially completely reacting with other materials, such as phosphoric acid, to produce derivatives thereof which are characterized by being of high quality both from a chemical and/or mechanical standpoint.

What is claimed is:

1. A process for the preparation of slaked lime having a viscosity of less than 2500 centipoises (Brookfield) at 25° C. when containing 17% lime comprising the steps of (1) contacting uniformly and intimately lime, which has a water reactivity of from about 30° C. to about 44° C., with water to form a free-flowing, partially hydrated lime, said water in an amount from about 5% to about 90% by weight of the amount of water required to theoretically completely hydrate said lime at a temperature below 200° C.; (2) aging said partially hydrated lime for at least one minute and at a temperature below 200° C. to insure the completion of the partial hydration thereof; and (3) contacting said partially prehydrated lime with an excess of water which initially has and is thereafter maintained at a temperature of from about 50° C. to about 100° C. to form a wet slaked lime which comprises an aqueous slurry having suspended therein particles of hydrated lime.

2. The process as set forth in claim 1 wherein (a) the amount of excess water utilized in step 3 is sufficient to provide from about 10% to about 44% by weight of solids in said aqueous slurry and (b) the resulting slaked lime slurry is cooled to a temperature range from about 5° C. to about 50° C.

3. The process as set forth in claim 2 wherein (1) the amount of water utilized in the prehydration step is sufficient to provide from about 10% to about 40% of that amount theoretically required to completely hydrate said quicklime; (2) the resulting aqueous slurry is agitated during the entire addition of said partially prehydrated quicklime thereto; and (3) the resulting slaked lime slurry has a total solids concentration of from about 15% to about 30% by weight.

4. The process as set forth in claim 3 wherein (a) the cooled slaked lime is passed through a U.S. Standard screen having a number not less than No. 250 mesh and (b) the cooled slaked lime, before screening, has a grit content of less than 5% by weight, based on the total weight of the solid in the slurry.

5. A continuous process for the preparation of slaked quicklime having a viscosity of less than 2500 centipoises (Brookfield) at 25° C. when containing 17% lime which comprises (1) continuously intimately and uniformly admixing water and quicklime, which has a water reactivity of from about 30° C. to about 44° C., to form a partially prehydrated, free-flowing quicklime, said water being in an amount from about 5% to about 90% by weight of that water required to theoretically completely hydrate said quicklime at a temperature below 200° C.; (2) continuously aging said quicklime at a temperature below 200° C. and for a period of about 3 to 30 minutes to insure the complete partial hydration thereof; (3) continuously feeding water and said partially prehydrated quicklime into a reaction zone, which contains an aqueous slurry containing water and slaked quicklime and having the desired viscosity level, to form additional quantities of said slaked quicklime, said slurry being continuously maintained at a temperature of from about 50° C. to about 100° C.; (4) continuously removing a portion of said aqueous slurry from said reaction zone, the average residence time of a single particle of such slaked lime being less than 60 minutes in said reaction zone.

6. The continuous process as set forth in claim 5 wherein (a) the water reactivity of said quicklime is from about 31 to about 38° C.; (b) the water utilized in the prehydration step is sufficient to supply from about 10% to about 40% by weight of that water required to theoretically completely hydrate said quicklime; (c) the amounts of water and partially prehydrated quicklime fed into said reaction zone are sufficient to provide a total solids concentration therein of from about 15% to about 30% by weight based on the total weight of the aqueous slurry in said reaction zone; (d) the temperature of said aqueous slurry is continuously maintained at from about 55° C. to about 75° C.; (e) said aqueous slurry is continuously agitated; (f) the average residence time of a single particle of said slaked lime is from about 15 to about 40 minutes in said reaction zone; and (g) the viscosity of the portion of said slurry removed from said reaction zone is from about 100 to about 2000 centipoises.

7. The continuous process as set forth in claim 6 and including a step of continuously cooling said aqueous slurry by decreasing the temperature of the removed portion of the said aqueous slurry to a temperature range from about 5° C. to about 50° C.

8. The process as set forth in claim 7 wherein (a) the prehydration step is conducted in a manner to maintain the average quicklime particle temperature at from about 100° C. to about 180° C.; (b) the cooled slaked lime is continuously passed through a No. 250 mesh U.S. Standard screen; and (c) the cooled slaked lime has a grit content, before screening, of less than 5% by weight, based on the total weight of the solids in the slurry so removed.

9. A process for preparing dicalcium orthophosphate which is characterized as being highly stable, as measured by its pH dirt, for dentifrice applications, and which process comprises (1) intimately and uniformly contacting lime, which has a water reactivity of from about 30° C. to about 44° C., with water to form a free-flowing, partially hydrated lime; said water being in an amount from about 5% to about 90% by weight of the amount of water required to theoretically completely hydrate said lime, this step being conducted in a manner to maintain the average lime particle temperature of less than 200° C. during such contacting; (2) aging said lime for at least one minute to insure the complete partial hydration thereof; (3) contacting said partially prehydrated lime with an excess of water which initially has a temperature of from about 50° C. to about 100° C. to form a wet-slaked lime which comprises an aqueous slurry having suspended therein particles of hydrated lime, said water being maintained during the addition of the partially prehydrated lime at a temperature of from about 50° C. to about 100° C.; (4) cooling said aqueous slurry to a temperature from about 5° C. to about 50° C.; (5) passing said cooled slurry through a U.S. Standard screen having a number not less than No. 250 mesh, said cooled aqueous slurry being characterized by having a controlled viscosity of less than 2500 centipoises (Brookfield) at 25° C. when containing 17% lime, and a grit content of less than 5%, before screening, by weight, based on the total weight of the solids in said slurry; and (6) contacting said aqueous slurry of slaked lime with phosphoric acid contained in an aqueous medium to form dicalcium orthophosphate, said phosphoric acid being used in an amount which at least theoretically completely reacts with substantially all of said slaked lime to convert to said dicalcium orthophosphate.

10. The process as set forth in claim 9 wherein (a) said lime is a quicklime which has a water reactivity of from about 31° C. to about 38° C.; (b) the amount of water utilized in the prehydration step is from about 10% to about 40% by weight of that water required to theoretically completely hydrate said quicklime; (c) the prehydration average quicklime particle temperature is from about 100° C. to about 180° C.; and (d) the water utilized in said slaking step, (3), is sufficient to provide from about 10% to about 44% by weight solids in said aqueous slurry and is maintained at from about 55° C. to 75° C.

11. The process as set forth in claim 10 wherein the aqueous medium containing said phosphoric acid is maintained, during the reaction of the slaked lime with said acid, at a temperature of less than 40° C. to form substantially the dihydrate form of dicalcium orthophosphate.

12. The process as set forth in claim 10 wherein the aqueous medium containing said phosphoric acid is maintained, during the reaction of the slaked lime with said acid, at a temperature of greater than 40° C. to form substantially the anhydrous form of dicalcium orthophosphate.

References Cited

Boynton, R. S., "Chemistry and Technology of Lime and Limestone," Interscience, New York, 1966 pp. 322–323, 325–326.

Van Wazer, J. R., "Phosphorous and Its Compounds," vol. II, Interscience, New York, 1961, p. 1649.

OSCAR R. VERTIZ, Primary Examiner

GEORGE T. OZAKI, Assistant Examiner

U.S. Cl. X.R.

23—188; 106—35

PO-1050
(5/69)

UNITED STATES PATENT OFFICE
CERTIFICATE OF CORRECTION

Patent No. 3,511,600     Dated May 12, 1970

Inventor(s) KEUN Y. KIM

It is certified that error appears in the above-identified patent and that said Letters Patent are hereby corrected as shown below:

Column 18, line 13, 5_.8 should read 16.8.  Column 20, line 51 dirt should read drift.

SIGNED AND SEALED
SEP 29 1970

(SEAL)
Attest:

Edward M. Fletcher, Jr.
Attesting Officer

WILLIAM E. SCHUYLER, JR.
Commissioner of Patents